Oct. 13, 1942.　　H. R. GREENLEE　　2,298,477
TRANSMISSION
Filed Sept. 26, 1940
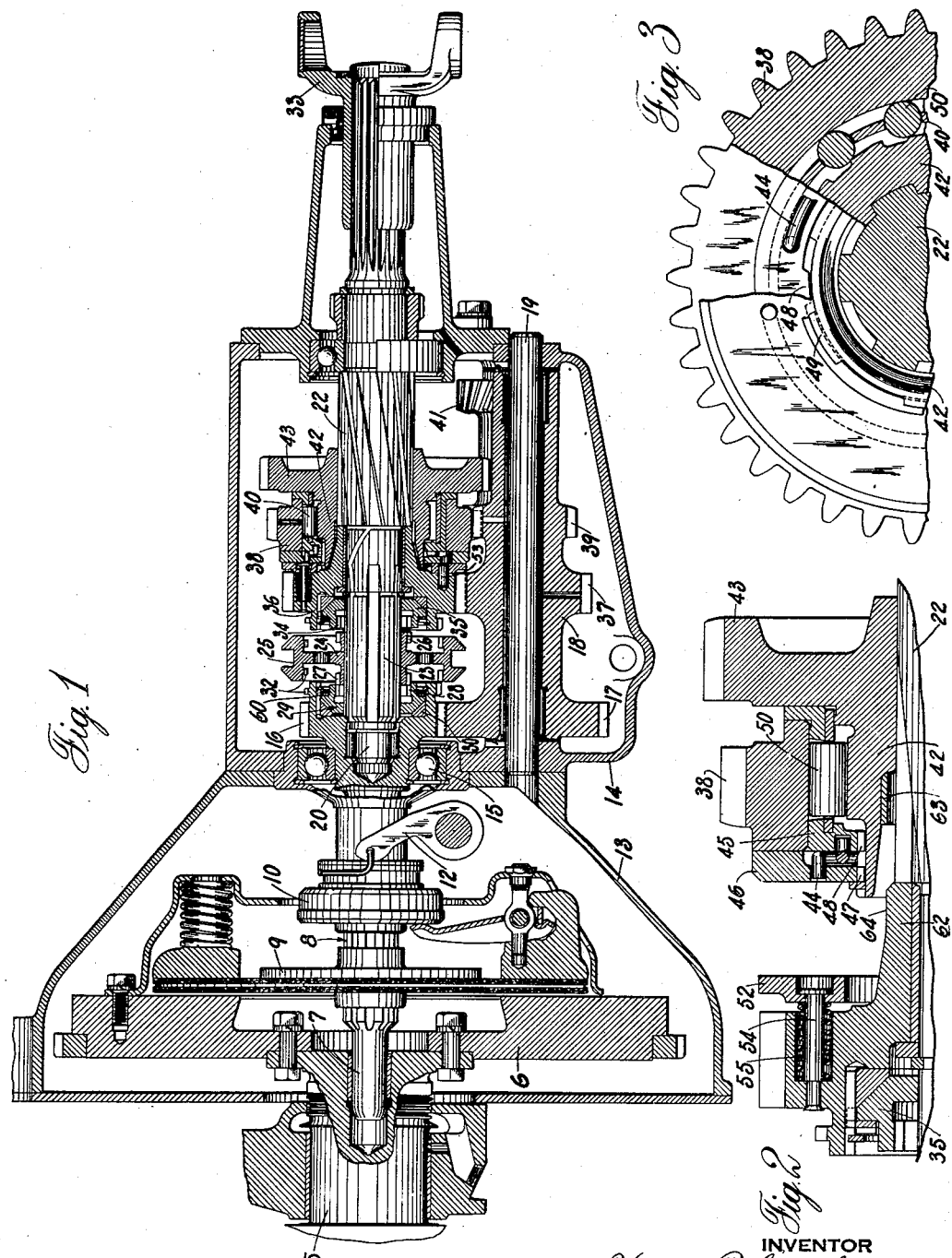
INVENTOR
Harry R. Greenlee
BY
Walter E. Schirmer
ATTORNEY Patented Oct. 13, 1942

2,298,477

UNITED STATES PATENT OFFICE 2,298,477

TRANSMISSION

Harry R. Greenlee, South Bend, Ind., assignor to The Studebaker Corporation, South Bend, Ind., a corporation of Delaware Application September 26, 1940, Serial No. 358,393

7 Claims. (Cl. 74—339)

This invention relates to transmissions and more particularly is directed to a transmission adapted for power shifting in which means is provided for allowing shifting of the transmission into third speed when the engine is dead to facilitate towing of the car or to start the motor by moving the car in gear.

With transmissions of this type in which a full blocking type synchronizer is employed between the direct drive gear and the tail shaft, if the vehicle comes to a stop with the engine dead, the blocking element of the synchronizer prevents shifting of the transmission into second or third speed because of its blocking action and, consequently, since if the engine remains dead the tail shaft will at all times continue to overrun the clutch shaft, the blocking action continues and it becomes impossible to shift into gear when towing or pushing the vehicle.

One of the primary objects of the present invention, therefore, is to provide means associated with the first speed gear whereby, when it is overshifted slightly, it can effect rotation of the intermediate speed gear which, through the countershaft, can rotate the direct drive gear at a faster speed than the tail shaft is rotated, thus bringing the blocking elements in the synchronizer into position to allow shifting.

Another object of the present invention is to provide a transmission in which the low speed gear is mounted upon the hub portion of the reverse gear by means of an overrunning clutch and has associated therewith a braking mechanism or clutch which can be engaged with the second speed gear.

Another desirable feature of the present invention is the provision of a mechanism for accomplishing the results desired which is simple in construction and can be readily assembled within the transmission case.

Another feature of the present invention is the provision of a resilient braking clutch between the first speed gear and the second speed gear whereby, in certain positions, they can be coupled for conjoint rotative movement.

Other objects and advantages of the present invention will appear more fully from the following detailed description which, taken in conjunction with the accompanying drawing, will disclose to those skilled in the art the particular construction and operation of the preferred form of the present invention.

In the drawing:

Figure 1 is a vertical sectional view through the bell housing and transmission case showing the transmission structure embodying the present invention;

Figure 2 is a slightly enlarged detailed sectional view of a portion of the transmission structure; and Figure 3 is an end view of a portion of the transmission structure with parts broken away for clarity.

Considering now in detail the structure shown in the drawing which is a preferred form of the invention, the engine crank shaft indicated at 5 has secured to the end thereof the flywheel 6 which flywheel and crank shaft are recessed to receive the journalled end 7 of a clutch shaft indicated generally at 8. The clutch shaft 8 has mounted thereon the clutch plate 9 carrying the friction clutch surfaces and the clutch actuating sleeve 10 actuated by means of the rocker arm 12. This clutch assembly is enclosed in a generally bell shaped housing 13 to the front end of which is secured a transmission housing 14. The clutch shaft extends through the forward wall of the transmission housing and is supported thereon by means of the bearing 15. The end of the clutch shaft is radially enlarged to form the drive gear 16 which has meshing engagement with the gear 17 of the compound gear 18 mounted on the countershaft 19 supported in the ends of the transmission housing.

Journalled in the recessed end of the drive gear 16 is the pilot end 20 of the transmission main shaft 22. Mounted on the splined reduced portion 23 of the transmission main shaft is a shifter clutch element 24 having the portion 25 adapted to be engaged by a shift fork. The member 24 is provided at the opposite ends with the clutch teeth 26 and 27, respectively.

The clutch teeth 27 are adapted to have clutching engagement with the teeth 28 of a synchronizer sleeve member indicated generally at 29, which sleeve member is splined on shaft 22 and is normally biased into frictional engagement with the conical surface of a friction ring 30 carried within the recessed end of the drive gear 16. Thus, the sleeve 29 is rotatable with the drive gear 16 and has slight clearance relative to the splines 23 so that when rotated by the drive assembly with the shaft 22 rotating at a slower speed, the sleeve 29 will ride along the back surface of the splines and consequently the teeth 28 will be out of alinement with the teeth 27. As a result, the member 24 cannot be shifted axially into engagement with the drive gear 16. When the speed of the shaft 22 and that of the gear 16 reach synchronization, the synchronizer sleeve 29 moves to a position such as to aline the teeth 27 and 28 for engagement. With power shifting mechanism biasing the member 24, this member is axially shifted at this point to bring the clutch teeth 32 into mesh to clutch the drive gear to the shaft 22. This effects direct drive from the engine shaft 5 to the tail shaft 22 of the transmission. At its rear end the tail shaft is provided with a companion flange 33 of a universal joint connecting the shaft to the propeller shaft of the vehicle.

The teeth 26 at the opposite end of the member 24 are adapted to have clutching engagement with the teeth 34 of a second synchronizer sleeve 35. The sleeve 35 is splined on shaft 22 and is in frictional engagement with a friction surface carried by the second speed gear 36 which is rotatably journalled on the tail shaft 22. This synchronizer operates in the same manner as described in connection with the drive gear 16, blocking axial shifting movement of the member 24 toward the gear 36 until such time as the gear teeth 26 and 34 come into alinement. The gear 36 is in constant meshing engagement with the gear portion 37 of the countershaft gear 18 and during normal operation when the gear 36 is clutched to the shaft 22, will transmit torque through the transmission from the drive gear 16 through the gear 17 and thence through the gears 37 and 36.

The first speed gear 38 is adapted to have meshing engagement with the gear portion 39 of the countershaft gear 18 and is supported by means of the overrunning clutch assembly 40 on the hub portion 42 of a reverse gear member 43. The gear 43 has meshing engagement with the gear idler 41 to provide for reverse drive of the shaft 22, it being understood that the gear 43 is splined on the shaft 22 as shown. The overrunning bearing or clutch 40 between the reverse speed gear and the hub portion of the reverse gear provides for a low speed drive from the drive shaft gear 16 through the gear 17 and thence from the gear 39 through the first speed gear 38 and clutch 40 of the gear 43 which in turn is splined on the shaft 22. It will therefore be apparent that if the shaft 22 is rotating faster than the gear 38 no effective driving connection is provided therebetween because of the overrunning clutch 40, which is shown in some detail in Figure 3. The rollers of the clutch 40 are normally held in position for engagement by means of a spring 44 which is biased at one end in the cage 45 of the overrunning clutch assembly and at its opposite end is biased in a plate member 46 which is rigidly splined as at 47 onto the externally splined end of the hub portion 42 of the gear 43. The cage 45 of the overrunning clutch is provided with internal splines 48 which are loosely received on the splines 49 of the hub portion 42 of the gear 43, whereby the cage has relative rotative movement with respect to the hub 42 to an extent necessary to engage and disengage the rollers 50 of the overrunning clutch to effect the desired driving engagement.

In the position shown in Figure 2 the transmission is indicated as in neutral with none of the gears engaged, except the reverse idler 41 with the countershaft. In normal operation the power shift is arranged to first shift the gear assembly comprising the gears 38 and 43 to the left to bring the teeth of the gear 38 into meshing engagement with the teeth of the counter shaft gear 39. This initiates rotation of the gear 38 in a clockwise direction as shown in Figure 3, causing this gear to be locked to the hub 42 by means of the overrunning clutch members 50 which roll up the inclined surface on the hub. As the clutch engages the gear 43 is likewise rotated to drive the tail shaft 22. In its normal shifted position, the gear 38 is so arranged that the plate 46 at the end of the face thereof is out of engagement with the friction plate 52 carried by the second speed gear 36. The plate 52 comprises a metal disc or annulus which is suitably supported by means of pins 53 and retaining studs 54 in a position nonrotatably connected to but biased away from the gear 36 by means of the coil springs 55. Thus, during normal operation the surface of the plate 46 and the surface of the plate 52 are not moved into engagement.

Continuing the shifting operation, when it is desired to shift into second speed the member 24 is moved to the right to couple the gear 36 to the shaft 22. In a well known manner the third speed is effected by opposite shifting of the member 24 which effects a direct drive through the transmission.

Assuming now, however, that the vehicle has stopped with the teeth 27 and 28 out of alinement so that blocking action occurs when a shift is attempted into high speed, when the engine is inoperative or cannot be started, it is impossible to move the member 24 into a direct drive position since the drive gear 16 cannot be rotated to bring the teeth 27 and 28 into alinement. This is true even though the vehicle be pushed or towed since the tail shaft 22 will always be running at a higher speed than the direct drive gear 16 so long as the engine remains inoperative and consequently the teeth 28 can never be relatively rotated into alinement with the teeth 27. Under these conditions, if it is desired to start the engine by towing or pushing, means must be provided to effect rotation of the drive gear 16 to establish the position of the teeth 28 so that the member 24 can be shifted.

This is provided in the present invention by slightly overshifting the low speed gear 38 together with the gear 43 toward the left. Since the gear 43 is splined on the shaft 22, it is apparent that if the vehicle is moved the shaft 22 rotates, consequently rotating the gear 43 and at the same time rotating the plate 46 which is in splined engagement with the hub 42 of the gear 43. The overshifting brings the surface of this plate into frictional engagement with the face of the plate 52 and effects rotation of the gear 36 which, of course, is free to rotate relative to the shaft 22. At the same time, by reason of the overrunning clutch the gear 38 is rotated even though it is in meshing engagement with the gear 39. The frictional contact between the plates 46 and 52 drives the gear 36 and consequently drives the gear 37 and the gear 16, rotating the drive gear 16 at a speed higher than that of the shaft 22 due to the ratios between the gears 36 and 37 and the gears 16 and 17.

This rotation of the drive gear 16 moves the synchronizer sleeve 29 therewith, this sleeve being pressed into engagement with the friction surface on the gear by means of the spring washer 60 biasing the same to the left, as shown in Figure 1. Thus the clutch teeth 28 are rotated faster than the shaft 22 and consequently move forwardly relative to the clutch teeth 27. As these clutch teeth pass through alinement the member 24 can be shifted axially to clutch the gear 16 to the shaft 22. This clutching engagement being effected, it follows that further towing of the vehicle will result in turning over of the clutch shaft. If and when the clutch 9 is released into engagement with the clutch surface of the flywheel 6 the engine can be cranked. It is to be understood that during the initial towing operation this overshifting of the first speed gear is effected to produce the desired rotation of the drive gear 16, the main clutch being disengaged during this period. Once the third speed shift has been effected, the gear 38 can be moved back to its neutral or gear engaged position and engagement of the clutch will then result in turning over the engine, which may be desired in order to start the same under certain conditions.

It is to be understood that the hub portion of the gear 36 is preferably axially extended as indicated at 62 and that the hub portion of the gear 43 is recessed as indicated at 63, whereby, when the gear 38 is shifted to the position as shown in Figure 3 for picking up rotation of the gear 36, the hub portion 42 of the gear 43 will be supported upon the hub portion 62 of the gear 36, this support of the gear 43 in its normal driving position holding the gears 38 and 43 against any rocking stresses which might otherwise be produced due to the overhang provided by mounting the gear 38 upon an extended portion of the gear 43. If desired, a suitable bushing may be provided on the adjacent surfaces 62 and 63, or these surfaces may be copper struck, as indicated at 64, to provide this support.

It is therefore believed apparent that I have provided novel means for rotating the drive gear at a higher speed than that of the tail shaft during towing or pushing in order to unblock the synchronizer mechanism to allow shifting into third speed.

I am aware that various changes may be made in certain details of the present construction and I therefore do not intend to be limited except as defined by the scope and spirit of the appended claims.

I claim:

1. A transmission comprising a countershaft, a tail shaft, a drive gear normally driving said countershaft, a first speed gear, means splined for axial shifting movement on said tail shaft, including an overrunning clutch coupling said first speed gear to said tail shaft, a second speed gear rotatably journalled on said tail shaft, gears on said countershaft engageable with said first and second speed gears, and friction clutch means operable upon predetermined axial shifting of said splined means for clutching said second speed gear to the tail shaft whereby rotation of said tail shaft will drive said countershaft through said second speed gear at an increased speed.

2. In a transmission of the character described, a tail shaft, a first gear rotatably journalled thereon and carrying a clutch surface extending radially relative to the axis of said shaft, a second gear splined for axial movement on said tail shaft and having an extended externally splined hub portion, an overrunning clutch on said hub portion, a gear mounted on said clutch and adapted to be coupled thereby to said tail shaft, and a corresponding radial friction member carried on the splines of said hub and operatively engageable with said radial clutch surface upon predetermined axial shifting of said second gear for rotating said first gear therewith independently of the rotation of said gear mounted on said overrunning clutch.

3. In a transmission, a tail shaft, a countershaft, a gear rotatably journalled on said tail shaft meshing with a gear on said countershaft, a second gear on said countershaft, a reversing gear splined on said tail shaft for axial sliding movement and carrying a rotatable first speed gear thereon by means of an overrunning clutch, said first speed gear being conjointly shiftable with said reversing gear in one direction to engage said first speed gear with said second countershaft gear for driving said tail shaft therefrom through said clutch, and means carried by said reversing gear and operable upon overshifting thereof to clutch said rotatable gear to said tail shaft for driving said first countershaft gear from said tail shaft at a speed greater than that of said tail shaft.

4. In combination, in a transmission having a tail shaft and a countershaft, a second speed gear rotatable on said tail shaft, corresponding gears on said countershaft in meshing engagement therewith, a reversing gear splined on said tail shaft and axially shiftable thereon, an extended hub portion on said reversing gear, an overrunning clutch carried thereon, a first speed gear rotatably mounted on said clutch, a second countershaft gear adapted to drive said tail shaft through said first speed gear and clutch upon axial shifting of said reversing gear in one direction, and radial clutch surfaces on said second speed gear and said extended hub portion operable upon further shifting of said reversing gear in the same direction for frictionally clutching said second speed gear to said tail shaft whereby rotation of said tail shaft will drive said countershaft at a higher speed.

5. In a transmission having a tail shaft, a countershaft, a reversing gear splined for axial sliding movement on said tail shaft and having an extended hub portion, a radially extending plate carried on said hub portion, a first speed gear confined between said plate and reversing gear, an overrunning clutch mounting said first speed gear on said hub portion, a second speed gear rotatably mounted on said tail shaft, and a radially extending plate carried on said second speed gear adjacent said first named plate, said reversing gear being axially shiftable to clutch said plates together for frictionally coupling said second speed gear to said tail shaft independently of the first speed gear.

6. The transmission of claim 4 further characterized in the provision of axially spaced gears on said countershaft, one of said gears being in constant meshing engagement with said second speed gear, and the other of said countershaft gears being in meshing engagement with said first speed gear during said coupling engagement.

7. In a transmission, a tail shaft, an axially shiftable member splined on said shaft and carrying a plate extending radially to the axis of said shaft, a first speed gear, overrunning clutch means journalling said gear on said member, a second speed gear rotatably journalled on said tail shaft and having a corresponding radial surface, a countershaft, a first gear thereon for driving said first speed gear upon predetermined shifting of said member in one direction, and a second gear on said countershaft in constant meshing engagement with said second speed gear, said member being operable upon overshifting to frictionally couple said second speed gear to said tail shaft through pressure engagement of said plates independently of the meshed position of said first speed gear.

HARRY R. GREENLEE.